2,723,966
METHOD OF PRODUCING SILOXANE ELASTOMERS USING DICHLOROBENZOYLPEROXIDE

Delmar C. Youngs, Midland, Mich., assignor to Dow Corning Corporation, Midland, Mich., a corporation of Michigan No Drawing. Application November 19, 1953, Serial No. 393,213

5 Claims. (Cl. 260—46.5)

This invention relates to a novel method of producing organopolysiloxane elastomers.

Organopolysiloxane elastomers, often called silicone rubbers, are by no means new in the art. These materials have been employed in various ways for different purposes for several years, and their physical properties have gained for them a steadily increasing popularity. However, certain limitations in the methods of vulcanization have been responsible for excluding these silicone rubbers from areas of use which otherwise would provide wider application than is presently feasible.

Among the limitations heretofore restricting the use of silicone rubber have been the difficulties encountered in the peroxide vulcanization of deep sections without undue bubbling. This bubbling heretofore encountered with peroxide vulcanized siloxanes has necessitated batchwise vulcanizaton rather than, for example, continuous extrusion followed by continuous vulcanization and has necessitated the use of pressure in effecting vulcanization. It has also been necessary in general to exclude oxygen during the vulcanization with peroxides. These limitations have been particularly obnoxious since to date peroxide vulcanization is the primary commercial process for vulcanizing siloxanes to elastomers.

In previously employed vulcanization methods, the necessary pressure has been applied simultaneously with heat in a closed mold or an autoclave at temperatures of from 110° C. to 150° C. for a period of from 5 to 15 minutes. It is to be understood that the term "vulcanization" as used herein refers to the initial cure of siloxane elastomers and does not include the so-called "after cure" which is generally carried out by heating the vulcanized elastomer in an oven for 24 hours at 250° C. There has never been a bubbling problem in the "after cure."

A tack-free surface is desirable, indeed necessary, for a satisfactory elastomeric product. However, silicones containing a peroxide vulcanizing agent have heretofore given tacky surfaces when vulcanized in an oxygen-containing atmosphere. This problem together with the bubbling problem was solved for very thin layers of silicones (i. e., .1 to 7 mils thickness) by Warrick as detailed in his U. S. Patent No. 2,494,920. However, the method of this patent is not applicable to vulcanizing silicones in deep section.

The vulcanization of siloxanes in deep section without bubbling has now been made possible by the combination of a new peroxide vulcanizing agent and a unique method of cure hereinafter set forth.

It is an object of the present invention to provide a method whereby deep sections of silicone rubber stock containing a peroxide vulcanizing agent (a "silicone rubber stock" consists of the organopolysiloxane, filler, vulcanizing agents and other additives admixed but not yet vulcanized) can be vulcanized without bubbling. Another object is to provide a method whereby such silicone rubber stock may be vulcanized in a continuous rather than batch-wise process. A further object is to obviate the necessity of excluding air and applying pressure while vulcanizing deep sections of such silicone rubber stock. Other objects and advantages of the present invention are detailed in or will be apparent from the following description and claims.

In accordance with this invention siloxane elastomers are prepared by heating a mixture of an organopolysiloxane having a plasticity of at least 30 mils, a filler, and dichlorobenzoyl peroxide containing two chlorine atoms per benzoyl radical, at a temperature of from 200° C. to 400° C. at substantially atmospheric pressure, whereby vulcanization of the siloxane to a tack-free surface occurs without bubbling. The organopolysiloxane is a methylpolysiloxane containing up to 30 mol per cent of a copolymerized siloxane of the group phenylmethylsiloxane, diphenylsiloxane, methylvinylsiloxane, phenylvinylsiloxane, and said organosiloxane has an average of from 1.9 to 2 total organic radicals per silicon atom.

The organopolysiloxanes which are operative in this invention can be dimethylsiloxane alone or copolymers of dimethylsiloxane with any combination of the above defined siloxanes. Preferably, the siloxane should contain at least 70 mol per cent dimethylsiloxane. Furthermore, a limited amount of siloxane units of the general formulae $RSiO_{3/2}$ and $R_3SiO_{1/2}$, where R is a univalent hydrocarbon radical selected from the group consisting of methyl, vinyl, and phenyl may also be present so long as the ratio of organic radicals per silicon atom is maintained within the average of 1.9 to 2.

These organopolysiloxanes may be linear polymers hence soluble in organic solvents such as benzene, toluene and petroleum naphtha, or they may be cross-linked due to the presence of monomethylsiloxane units and therefore insoluble in such organic solvents. The organopolysiloxane employed must, of course, be pliable and extrudable in order to enable fabricators to mill in filler, vulcanizing agent, and any other desirable additives before vulcanization. However, it must have a plasticity of at least 30 mils as measured by the parallel plate plastometer test described in A. S. T. M. Test D926–47T. This test involves the use of the Williams' Parallel Plate Plastometer which consists of two plates, mounted on a frame so that one plate moves with respect to the other, and the two plates are parallel within 1 degree at all times. The specimen is placed between the plates and subjected to a force of 5,000 grams. The distance between the plates is indicated on a dial and can be determined at any time during the test. The test specimens employed in this test are prepared as called for by the A. S. T. M. except that a 4.2 gram test sample (approximately 4 cc.) was employed in place of the 2 cc. sample called for in the test specifications. Each test sample is placed between the plates employing paper to prevent the specimens from sticking to the plates. The 5,000 gram weight is lowered onto the top plate, and the full 5,000 gram force applied to the test specimen for 3 minutes. The difference in distance between the plates before the force was applied and after it has been applied for the full 3 minutes is measured in mills and is the "plasticity."

The elastomer may contain any of the well-known fillers including extremely finely divided fillers such as silica aerogels and fume silicas and fillers of larger particle size such as asbestos, clay 188, hydrated calcium silicate, zinc sulfide, Buca clay, barium titanate, Fiberglas floc, iron oxide, Wyoming bentonite, lithopone, zinc oxide, titania, magnesia, micronized graphite, micronized slate, micronized mica, crushed quartz, diatomaceous earth, $PbO_2$, PbO, blue lead, dehydrated alumina and hydrated alumina. The particular filler employed will depend upon the characteristics particularly sought in the finished product, as is well known in the art.

I have found that of the many peroxides presently employed as vulcanizing agents in silicone rubber stocks only dichlorobenzoyl peroxide, available commercially as Luperco C. S. F., gives the superior non-bubbling, deep-section vulcanization disclosed herein. The dichlorobenzoyl peroxide may be admixed with the organopolysiloxane by any of the means well known in the art for compounding silicone rubber stock. It may be employed in any amount, but it is preferable to use from .1 to 10 parts by weight based on 100 parts by weight of the siloxane used.

Small amounts of additives such as pigments, oxidation inhibitors, compression-set improvers and others equally well known in the art may be added to the silicone rubber stock as desired by the fabricator. The addition of such additives is, of course, optional and their inclusion will depend upon the need for exceptional qualities not obtainable without such additives, but their use in no way adds to or detracts from the novel features of this invention.

The silicone rubber stock may be compounded in any desired manner. The various components may be admixed in any order desired. After compounding the siloxane is cured at a temperature of from 200° C. to 400° C., preferably from 300° C. to 375° C. Temperatures below 200° C. are impractical, because the time necessary to effect vulcanization at less than 200° C. results either in excessively slow movement of the material through the oven or in an excessively long oven. Operation at temperatures exceeding 400° C. is uneconomical.

The vulcanization period depends upon the temperature at which vulcanization is being effected, upon the size and shape of the extrusion, and upon the type of siloxane employed. The fabricator can determine the minimum vulcanization period by observing the length of time necessary to obtain a tack-free surface. Vulcanization for a period of time longer than necessary does not deleteriously affect the resulting elastomer but does increase the cost of vulcanization by slowing the process. Higher temperatures give adequate vulcanization in a shorter period of time but very high temperatures (i. e., in excess of 400° C.) are difficult to maintain in an open system and no benefits are obtained by employing them. Thick extrusions require a longer vulcanization period than thin sections. Some variation may also be noted in the lnegth of time necessary to cure extrusions of equivalent size and shape at a given temperature but with various compositions of the silicone rubber stock.

This invention permits the vulcanization of deep sections, as well as thin sections, of silicone rubber stock without the occurrence of bubbling. This can be accomplished by vulcanization at atmospheric pressure and in the presence of oxygen, although the use of superatmospheric pressure and/or the exclusion of oxygen from the vulcanization zone is not a material departure from my invention.

This process lends itself particularly well to a continuous operation. For example, a continuous extrusion may be carried to and through an open oven wherein a continuous vulcanization process may be carried out. However, batch-wise vulcanization can also be successfully carried out under this invention.

The following examples will serve to give those skilled in the art a better understanding of my invention. All examples are merely illustrative and are not to be construed as limiting my invention, the scope of which is properly delineated in the appended claims.

EXAMPLE 1

The equipment for this and the following examples consisted of a machine for extruding the elastomer, an endless belt of stainless steel running over rollers and about 10 feet in length; a heated chamber 8 feet long surrounding the upper section of the belt and consisting of an open lattice metal frame surrounded by a glass blanket into which was woven electrical resistance wires which served as the heating element. This chamber could be heated to temperatures in the range specified, i. e., 200° C. to 400° C.

A silicone rubber stock was compounded as follows (all parts by weight): 100 parts dimethylsiloxane having a plasticity of 50–60 mils, 35 parts fume silica filler, 15 parts diatomaceous earth filler, 1 part zinc oxide filler, 10 parts barium zirconate paste filler, and 1.5 parts of the vulcanizing agent 2,4-dichlorobenzoyl peroxide (available commercially as Luperco C. S. F.). This rubber was extruded in several thicknesses and vulcanized at temperatures and for the times set forth in Table I infra.

Table I

| Extrusion Thickness in inches | Vulcanization time in seconds | Temperature, °C. | Rate through heating chamber, ft./min. |
|---|---|---|---|
| .039 | 15 | 350 | 32.0 |
| .064 | 21 | 350 | 23.0 |
| .200 | 48 | 350 | 10.0 |
| .335 | 111 | 350 | 4.3 |
| .500 | 120 | 350 | 4.0 |

All of the sections were well vulcanized. There were no signs of sponging or blistering indicating that there was no bubbling and no deleterious surface effect caused by oxygen in the heating zone. The silicone rubber produced was at least the equal in all other significant physical properties to other silicone rubbers heretofore available.

EXAMPLE 2

Employing the method of Example 1, a silicone rubber stock was compounded as follows (all parts are by weight): 100 parts dimethylsiloxane having a plasticity of 50–60, 65 parts fume silica filler, 1 part zinc oxide filler, 10 parts barium zirconate paste filler, 3.1 parts of a vulcanizing agent consisting of 35 per cent by weight dichlorobenzoyl peroxide and 65 per cent by weight calcium phosphate. The results with this silicone rubber are summarized in Table II infra.

Table II

| Extrusion Thickness in inches | Vulcanization time in seconds | Temperature, °C. | Rate through heating chamber, ft./min. |
|---|---|---|---|
| .038 | 15 | 350 | 32.0 |
| .062 | 25 | 350 | 19.0 |
| .170 | 56 | 350 | 8.5 |
| .290 | 72 | 350 | 6.5 |
| .375 | 102 | 350 | 4.7 |
| .625 | 109 | 350 | 4.5 |
| .688 | 79 | 350 | 6.0 |
| 1.062 | 125 | 350 | 3.8 |

All of the sections were well vulcanized and the silicone rubber exhibited characteristics identical to those described in Example 1.

EXAMPLE 3

Employing the method of Example 1, a silicone rubber stock was compounded as follows (all parts are by weight): 100 parts organopolysiloxane consisting of 92.36 mol per cent dimethylsiloxane, 7.5 mol per cent phenylmethylsiloxane and .14 mol per cent methylvinylsiloxane, having a plasticity of 55 to 75 mils, 70 parts fume silica filler, 4 parts ferric oxide filler, 1 part of the vulcanizing agent dichlorobenzoyl peroxide (available commercially as Luperco C. S. F.). This rubber was extruded in several thicknesses and vulcanized at temperatures and for the times set forth in Table III infra.

Table III

| Extrusion Thickness in inches | Vulcanization time in seconds | Temperature, °C. | Rate through heating chamber, ft./min. |
|---|---|---|---|
| .062 | 90 | 350 | 5.3 |
| .281 | 150 | 350 | 3.2 |
| 1.000 | 215 | 350 | 2.2 |

All of the sections were well vulcanized, and the silicone rubber exhibited characteristics identical to those described in Example 1.

EXAMPLE 4

Equivalent results were obtained when a copolymeric siloxane composed of 90 mol per cent dimethylsiloxane and 10 mol per cent diphenylsiloxane is employed in the method of Example 1.

EXAMPLE 5

Equivalent results are obtained when .14 mol per cent phenylvinylsiloxane is employed instead of the methylvinylsiloxane in the process of Example 3.

That which is claimed is:

1. A method of producing siloxane elastomers which comprises heating a mixture of a methylpolysiloxane containing up to 30 mol per cent of a copolymerized siloxane of the group consisting of phenylmethylsiloxane units, diphenylsiloxane units, methylvinylsiloxane units, and phenylvinylsiloxane units, said methylsiloxane having a plasticity of at least 30 mils, the ratio of organic radicals to silicon atoms in said siloxane being, on the average, 1.9 to 2.0, a filler, and dichlorobenzoyl peroxide containing two chlorine atoms per benzoyl radical, at a temperature of from 200° C. to 400° C. whereby vulcanization of the siloxane without bubbling is obtained.

2. The method of claim 1 wherein the siloxane is a dimethylsiloxane containing up to 30 mol per cent of copolymerized phenylmethylsiloxane units.

3. The method of claim 1 wherein the siloxane is a dimethylsiloxane containing up to 30 mol per cent methylvinylsiloxane units.

4. The method of claim 1 wherein the vulcanization is at a temperature of from 300° C. to 375° C.

5. A method of producing siloxane elastomers which comprises heating a mixture of a methylpolysiloxane containing up to 30 mol per cent of a copolymerized siloxane of the group consisting of phenylmethylsiloxane, diphenylsiloxane, methylvinylsiloxane and phenylvinylsiloxane, said methylsiloxane having a plasticity of at least 30 mils and having on the average from 1.9 to 2 of said hydrocarbon radicals per Si atom, a filler, and dichlorobenzoyl peroxide containing two chlorine atoms per benzoyl radical, at a temperature of from 200° C. to 400° C. at substantially atmospheric pressure whereby vulcanization of the siloxane without bubbling is obtained.

References Cited in the file of this patent

UNITED STATES PATENTS

| 2,494,920 | Warrick | Jan. 17, 1950 |
| 2,658,882 | Maneri | Nov. 10, 1953 |